(12) United States Patent
Schaefer (10) Patent No.: US 10,431,053 B2
(45) Date of Patent: Oct. 1, 2019

(54) DETERMINATION OF FILLING LEVELS AT THE CHECKOUT TERMINAL

(71) Applicant: Oliver Schaefer, Berlin (DE)

(72) Inventor: Oliver Schaefer, Berlin (DE)

(73) Assignee: WINCOR NIXDORF INTERNATIONAL GMBH (DE)

( * ) Notice: Subject to any disclaimer, the term of this patent is extended or adjusted under 35 U.S.C. 154(b) by 85 days.

(21) Appl. No.: 15/511,758

(22) PCT Filed: Aug. 20, 2015

(86) PCT No.: PCT/EP2015/069131
§ 371 (c)(1),
(2) Date: May 31, 2017

(87) PCT Pub. No.: WO2016/041729
PCT Pub. Date: Mar. 24, 2016

(65) Prior Publication Data
US 2018/0108223 A1 Apr. 19, 2018

(30) Foreign Application Priority Data
Sep. 17, 2014 (EP) .................................. 14185176

(51) Int. Cl.
*G06K 15/00* (2006.01)
*G07G 1/00* (2006.01)
(Continued)

(52) U.S. Cl.
CPC ........... *G07G 1/0063* (2013.01); *A47F 9/048* (2013.01); *B07C 5/38* (2013.01); *G05B 19/124* (2013.01);
(Continued)

(58) Field of Classification Search
CPC .... G06Q 20/20; G06Q 20/201; G06Q 20/208; G07G 1/0009; G07G 1/0018;
(Continued)

(56) References Cited

U.S. PATENT DOCUMENTS

| 4,909,356 A | 3/1990 | Rimondi et al. |
| 5,256,864 A | 10/1993 | Rando et al. |
| 5,491,328 A * | 2/1996 | Rando .................... A47F 9/046 235/462.14 |
| 5,641,039 A * | 6/1997 | Dumont .................. A47F 9/042 186/61 |

(Continued)

OTHER PUBLICATIONS

International Search Report and Written Opinion of International Searching Authority for related PCT application; dated Oct. 6, 2015.

*Primary Examiner* — Thien M Le
*Assistant Examiner* — April A Taylor
(74) *Attorney, Agent, or Firm* — Black, McCuskey, Souers & Arbaugh LPA (57) ABSTRACT

A checkout terminal, and method of using, having a goods receiving area for receiving goods, a goods recording area for recording the data of the goods, and a goods dispensing area for dispensing the goods. The checkout terminal further has a control unit configured for controlling the operation of the checkout terminal. The goods dispensing area has a first packing trough which is configured for temporarily collecting the goods. A goods transport means is configured for transporting the goods along a direction of transport form the goods receiving area via the goods recording area toward the first packing trough of the goods dispensing area. The goods recording area having a goods recording device having a scanner, which is configured for scanning a respective scannable identifier of the goods, located within a goods recording volume of the goods recording area and for providing a scanning result signal.

20 Claims, 2 Drawing Sheets

(51) Int. Cl.
*A47F 9/04* (2006.01)
*B07C 5/38* (2006.01)
*G05B 19/12* (2006.01)
*G05B 19/418* (2006.01)
*B07C 5/04* (2006.01)
*G06K 19/06* (2006.01)
*G06Q 20/20* (2012.01)

(52) U.S. Cl.
CPC ....... *G05B 19/4189* (2013.01); *G07G 1/0054* (2013.01); *G07G 1/0072* (2013.01); *B07C 5/04* (2013.01); *G05B 2219/2621* (2013.01); *G05B 2219/36371* (2013.01); *G06K 19/06028* (2013.01); *G06Q 20/201* (2013.01)

(58) Field of Classification Search
CPC .. G07G 1/0036; G07G 1/0045; G07G 1/0054; G07G 1/0063; G07G 1/0072; A47F 9/00; A47F 9/04; A47F 9/042; A47F 9/043; A47F 9/046; A47F 9/047; A47F 9/048; B65G 43/08; B65G 43/10; B65G 47/52; B65G 47/68; B65G 47/681; B65G 47/682; B65G 47/69; B65G 47/71; B65G 47/715; B65G 47/72
See application file for complete search history.

(56) References Cited

U.S. PATENT DOCUMENTS

| | | | |
|---|---|---|---|
| 6,550,583 B1* | 4/2003 | Brenhouse | A47F 9/042 186/61 |
| 6,779,722 B1* | 8/2004 | Mason | A47F 9/046 235/375 |
| 7,866,546 B1* | 1/2011 | Vance | G07G 1/14 235/379 |
| 9,778,093 B2* | 10/2017 | Gatto | G01G 15/00 |
| 2007/0051561 A1* | 3/2007 | Harris | A47F 9/04 186/59 |
| 2008/0054071 A1 | 3/2008 | Kangas et al. | |
| 2008/0121702 A1* | 5/2008 | Fortenberry | G01G 19/4144 235/383 |
| 2009/0090584 A1* | 4/2009 | Chakra | A47F 9/047 186/61 |
| 2012/0187194 A1* | 7/2012 | Svetal | G07G 1/0045 235/470 |
| 2013/0020391 A1* | 1/2013 | Olmstead | G06K 7/10722 235/438 |
| 2014/0151187 A1 | 6/2014 | Phan et al. | |
| 2014/0324613 A1* | 10/2014 | Edwards | A47F 9/04 705/23 |
| 2014/0353115 A1* | 12/2014 | Baitz | A47F 9/047 198/340 |

* cited by examiner

FIG 1B

DETERMINATION OF FILLING LEVELS AT THE CHECKOUT TERMINAL

CROSS-REFERENCE TO A RELATED APPLICATION

This application is a National Phase Patent Application of International Patent Application Number PCT/EP2015/069131, filed on Aug. 20, 2015, which claims priority of the European Patent Application EP14185176.6, filed on Sep. 17, 2014.

BACKGROUND

The present invention relates to a checkout terminal, to a goods recording device for a checkout terminal, and to a method for operating a checkout terminal.

Checkout terminals are used, for example, in stores selling goods where a customer, as part of a purchase process, initially assembles some goods and, for the purpose of payment, he looks for a checkout terminal where the goods of the customer are received, their data are recorded and the goods are then dispensed again to the customer. On the basis of the recording of the data of the goods, a final price can be determined which has to be paid by the customer for his goods. Checkout terminals can be operated by a service person or operate autonomously (so-called self-service checkout terminals).

A generic checkout terminal has a goods receiving area for receiving goods, a goods recording area following the goods receiving area for recording the data of the goods, and a goods dispensing area following the goods recording area for dispensing the goods, the data of which have been recorded, to the customer.

The goods dispensing area of a generic checkout terminal has a first packing trough which is configured for temporarily collecting the goods, the data of which have been recorded. In the first packing trough the goods are collected so that the customer can remove them from the goods dispensing area and, for example, reload them into a bag of his own.

A goods transport means is provided for transporting the goods from the goods receiving area toward the first packing trough of the goods dispensing area over the goods recording area along a direction of transport.

A control unit configured for this purpose usually controls the operation of the checkout terminal, for example the transport of the goods carried out by the goods transport means.

Furthermore, the generic checkout terminal has a goods recording device having a scanner, arranged in the goods recording area, the scanner being configured for scanning a respective scannable identifier of the goods located within a goods recording volume of the goods recording area and for providing a scanning result signal s.

A generic checkout terminal is known, for example, from WO 2013/120 875 A2.

The capacity volume of the first packing trough is restricted so that the first packing trough can only accept a particular quantity of goods. In the case of the previously known checkout terminal, it is disadvantageous that the first packing trough can be overfilled.

SUMMARY

Accordingly, it is the object of the present invention to propose a checkout terminal, a goods recording device for a checkout terminal and a method for operating a checkout terminal in which or by means of which overfilling of the first packing trough is avoided in cost-effective and reliable manner.

This object is achieved by one of the subject matters described herein.

In an embodiment of the checkout terminal, the goods recording device has additionally a measuring unit which is configured for measuring the goods located within the goods recording volume and for providing a measuring result signal. Furthermore, the control unit has a computer which is configured for calculating a filling level value in dependence on the scanning result signal and in dependence on the measuring result signal, the filling level value being indicative of a goods filling level volume of the first packing trough.

The control unit which controls the operation of the checkout terminal calculates the goods filling level volume of the first packing trough not only in dependence on the scanning result signal but also in dependence on the measuring result signal. This allows a more accurate calculation of the goods filling level volume of the first packing trough.

Furthermore, sensors for calculating the goods filling level volume can be omitted in the first packing trough. The calculation of the goods filling level volume thus takes place advanced in time and location and not only in the first packing trough. If a number of packing troughs are provided in the goods dispensing area, the respective goods filling level volume is calculated centrally at the control unit, for example referred to the packing trough which is currently being filled. Thus, sensors can be saved overall since not every one of the multiplicity of packing troughs has to be equipped with a corresponding sensor system. Instead, such a sensor system can be omitted.

The control unit can control the operation of the checkout terminal particularly in dependence on the filling level value, that is to say in dependence on the current goods filling level volume of the first packing trough. Thus, the control unit can prevent, for example, that the goods transport means transports further goods into the first packing trough when a maximum goods filling level volume of the first packing trough is reached. Thus, overfilling of the first packing trough and the associated disadvantages such as, for example, a collapsing of goods from the goods dispensing area and/or squeezing of goods in the first packing trough can be avoided.

Overall, a more undisturbed operation of the checkout terminal is achieved. In consequence, the checkout terminal of one or more embodiments achieves a higher goods throughput and faster customer service and an increased customer satisfaction.

In the text which follows, further embodiments of the checkout terminal as outlined above are described. The additional features of these further embodiments can be combined with one another and with the optional features, already described above, for forming further exemplary embodiments if they have not been described expressly as alternative with respect to one another.

The checkout terminal is suitable, for example, for a use in a goods sales store such as a supermarket. The goods which have been received, the data of which have been recorded, and which have been dispensed by the checkout terminal are, for example, end user products such as food supplies, clothing items, domestic products, medications, home improvement objects etc. The present invention is not restricted to any particular goods, however.

For example, the checkout terminal can be equipped with a payment device which is operatively connected to the goods recording device and/or the control unit so that a process of paying for goods assembled by a customer can be performed.

The goods dispensing area with the first packing trough follows the goods recording area, for example, which, in turn, follows the goods receiving area, for example.

The goods transport means connects these three areas to one another, for example. The goods transport means is configured in the form of a conveyor belt and arranged in such a manner that it transports the goods which a customer has given into the goods receiving area, through the goods recording area up to the first packing trough of the goods dispensing area. In other words, the conveyor belt of the goods transport means extends, for example, from the goods receiving area through the goods recording area up to an input area of the first packing trough. The conveyor belt can also comprise a number of part-conveyor belts, a first part-conveyor belt, for example, extending into the goods receiving area and into the goods recording area and a second part-conveyor belt extending into the goods dispensing area. The two part-conveyor belts can adjoin one another, for example, at a transfer point so that the second part-conveyor belt can automatically accept goods from the first part-conveyor belt.

The goods recording device with the scanner is arranged in the goods recording area. The scanner is configured, for example, as tunnel scanner and arranged like a bridge over the goods transport means so that the goods transport means transports the goods handed over by the customer through under the tunnel scanner up to the goods dispensing area. Instead of the tunnel scanner, a scanner configured differently can also be provided, for example a flat scanner over which the goods are transported away by the transport means, or a handheld scanner, to be operated manually.

On the goods, a scannable identifier is applied in each case. The scannable identifier is an arbitrarily configured identifier which allows the scanner to perform an identification of the scanned goods if the goods are located in the goods recording volume. The goods recording volume designates, for example, a volume in which the goods have to be located so that scanning of the goods by the scanner and measuring of the goods by the measuring unit are possible.

The scannable identifier is, for example, a barcode, a QR code, an RFID label, an NFC label, a universal product code (UPC), a digital watermark and/or the like. The present invention is not restricted to any particular type of a scannable identifier. The scanner can also be configured, for example, as RFID reader or as NFC reader or comprise a means which allows scanning of mutually different identifiers, for example means for scanning a barcode and an RFID code.

The scanning result signal provided by the scanner is particularly indicative of an identification of the scanned goods, for example an unambiguous product code. By means of the scanning result signal, prestored goods-related data can be procured, for example, which are allocated to the respective scanned goods. This procuring of goods-related data occurs, for example, via the scanner and/or via the control unit. The goods-related data can be especially dimensions of the goods and/or a volume of the goods, a weight of the goods, a type or a category of the goods and/or storage characteristics of the goods. Such data are stored, for example, on a database which can be accessed by the checkout terminal, either through the scanner and/or through the control unit. On the database, it is stored, for example, which spatial dimensions the scanned goods have, what weight the goods have, which type the scanned goods have, for example "fragile", "to be cooled", "do not squeeze" etc. Furthermore, the goods-related data can indicate which storage characteristics the scanned goods have, if there is, for example, a tendency to tilting (for example in the case of vertically standing drinks containers) or if there is a possibility of undamaged volume reduction (for example in the case of sponges), or if the goods have a tendency to get under other goods (e.g. soup bags or similarly packaged goods) and the like. Such goods-related data flow into the calculation of the filling level value in one embodiment which will be discussed in greater detail still at a later point.

Apart from the scanner, the goods recording device also has the measuring unit which is configured to measure the goods which are located within the goods recording volume and to provide a corresponding measuring result signal.

The goods are measured, for example, optically, for example by using a number of light sources such as light sources which emit visible light and/or infrared light, or acoustically, for example by means of ultrasound.

The goods can be measured either at the same time as they are scanned, before or after this in time. Both the scanning and the measuring are preferably carried out during a common period.

The measuring result signal is, for example, indicative of a floor area of the goods located within the goods recording volume, the floor area corresponding to a surface of the goods which faces the measuring unit. The floor area is, for example, the surface of the goods seen by the measuring unit when the goods pass the goods recording device and/or indicative of a distance of the goods located within the goods recording volume from the measuring unit.

The control unit receives both the scanning result signal and the measuring result signal. Thus, the control unit can infer, for example, which orientation the goods located in the goods recording volume have.

For example, the scanned goods are identified as cuboid drinks bag by means of the scanning result signal. The goods-related data which have been procured by means of the scanning result signal or are already provided as part of the scanning result signal specify, for example, that the cuboid drinks bag has a bottom defined by a depth and a width and a height which exceeds the depth and the width by a multiple. This drinks bag could be lying on one of its side faces (depth×height or width×height) or standing on its bottom defined by the depth and width. The scanning result signal might not provide any information about the orientations which are in question. However, since the measuring unit of the goods recording device measures the goods with regard to their spatial dimensions, the control unit can conclude, for example, whether the cuboid drinks bag is lying on the goods transport means along its height or is standing on its bottom. Naturally, a lying drinks bag takes up more room in the first packing trough than a standing drinks bag. The same applies correspondingly to drinks bottles or similar packing formats.

By means of this example, it has been demonstrated that the knowledge of the state of storage of the goods is appropriate for the determination of the filling level value. As has been explained by means of the example just described, the control unit is configured, for example, to conclude by means of the scanning result signal and by means of the measuring result signal the existence of such a state of storage and to take into consideration this finding in calculating the filling level value.

Consideration of the measuring result signal and the scanning result signal also lets the control unit conclude, for example, whether scanned goods possibly cover other goods. For example, the measuring unit is arranged at a particular height above the goods transport means so that it is possible by means of a comparison between the distance of the scanned goods from the measuring unit and the difference between the height and a greatest dimension of the scanned goods to determine whether further goods are still lying underneath the scanned goods or not. This information, too, can be advantageously taken into consideration in the determination of the filling level value, especially when the scanned goods and the goods located underneath are conveyed into the first packing trough in these constellations. The goods arranged above one another take up less room in the first packing trough than goods arranged next to one another.

The control unit of the checkout terminal can be arranged, for example, distributed within the checkout terminal or configured as one piece. For example, the control unit comprises a microcontroller or another programmable chip for the purpose of calculation of the filling level value. For controlling the components of the checkout terminal, the control unit is operatively connected, for example, to the goods receiving area, the goods recording area, the goods dispensing area and/or to the goods transport means. The control unit can also be implemented as part of the goods recording device.

In one embodiment, the control unit and/or the scanner are/is configured to procure by means of the scanning result signal said prestored goods-related data which are allocated to the respective scanned goods. For this purpose, the scanner and/or the control unit are/is coupled, for example, to a database which keeps available the prestored goods-related data. The database can also be part of the checkout terminal or be arranged remote from it. The location of storage of the goods-related data is presently less important; instead, it is sufficient that the checkout terminal can access the goods-related data, in whatever form this is done. The goods-related data can be conveyed to the control unit already as part of the scanning result signal from the scanner.

In one embodiment, the computer of the control unit is configured to compare the procured goods-related data with the measuring result signal and to calculate the filling level value in dependence on the comparison. As has been explained above by means of the example of the cuboid drinks bag, the control unit can infer a state of storage, especially, of the goods, the data of which have been recorded, on the basis of such a comparison. Thus, depending on whether goods are being transported lying, standing or however else by the goods transport means toward the first packing trough, the calculated filling level value changes.

In a further embodiment, the computer of the control unit is configured to determine, and take into consideration in the calculation of the filling level value, by means of the measuring result signal and by means of the procured goods-related data at least one of the following parameters: a number of the goods located in the goods recording volume; an orientation of the goods located in the goods recording volume; an arrangement of the goods located in the goods recording volume; and a goods volume of the goods located in the goods recording volume.

Thus, the control unit can infer, for example, whether goods in the goods recording volume are arranged, for example, above one another, whether goods must be rerecorded manually, in which alignment the goods are set up, etc. These findings, too, are preferably taken into consideration in the calculation of the filling level value by the computer of the control unit.

In a further embodiment, the control unit has a memory which is configured to store an adaptable threshold value, the control unit also being configured for comparing the calculated filling level value with the adaptable threshold value and for providing a control signal in dependence on the comparison, the control signal preferably indicating whether the first packing trough is to be filled further or not.

The adaptable threshold value is, for example, indicative of a maximum goods filling level volume of the first packing trough.

If this is exceeded, there can be squeezing of goods and/or falling down of goods out of the goods dispensing area within the first packing trough. To avoid this, the control unit preferably continuously performs a comparison between the calculated filling level value and the stored adaptable threshold value and provides the control signal in dependence on the comparison. By means of the control signal, the transportation of the goods by the transport means is interrupted or slowed down, for example, when the control signal indicates that the first packing trough should not be filled further.

In one embodiment, the checkout terminal also has a user interface having an input means for receiving user inputs and an output means for outputting information relevant to a checkout process, the output means being configured to indicate in dependence on the control signal (for example optically, acoustically and/or haptically), whether the first packing trough is to be filled further or not. The input means is configured to forward at least one user input to the control unit, the at least one user input indicating whether the first packing trough is to be filled further or not.

The control unit is preferably configured to adapt the threshold value in dependence on the at least one user input. On the one hand, it is possible with this variant that it is indicated to a service person who is operating the checkout terminal, by means of the output means, that the first packing trough should not be filled further. Thus, the service person can intervene, for example, manually in the occurrence and prevent or slow down the transportation of further goods into the first packing trough. However, this can also take place, as described above, in an automated fashion, i.e. without manual intervention by a service person. On the other hand, a service person also has the capability of indicating to the control unit whether the first packing trough is to be filled further or if the filling of the first packing trough is to be interrupted. Depending on this at least one user input, the control unit adapts the threshold value. In other words, a service person has the capability of training the control unit with regard to the output of the control signal. For example, the service person can acknowledge, that is to say confirm, information obtained by the output means which indicates that a maximum filling level volume of the first packing trough has been reached, or reject it, and thus to demonstrate to the control unit that further filling of the first packing trough is possible. On the basis of these inputs, the control unit corrects the adaptable threshold value downward or upward or leaves the adaptable threshold value unchanged.

In one embodiment, the control unit is configured to operate the checkout terminal according to a normal mode or a learning mode, the at least one user input being ignored in the normal mode and no adaptation of the threshold value taking place. If, instead, the checkout terminal is in the learning mode, the control unit accepts the at least one user input and performs an adaptation of the threshold value in dependence on the user input.

In a further embodiment, the goods transport means is configured to control the transportation of the goods in dependence on the filling level value and/or in dependence on the control signal. For example, the goods transport means reduces a transport speed with which the goods are transported from the goods receiving area toward the first packing trough when a particular filling level value is reached. In another example, the goods transport means stops the further transportation of goods toward the first packing trough when the control signal indicates that the first packing trough is no longer to be filled.

In a further embodiment, the goods dispensing area comprises a second packing trough and the checkout terminal has a separating means, arranged movably along a direction of movement between at least a first separating position and a second separating position, which is configured to separate the first packing trough and the second packing trough spatially from one another. If the separating means is in the first separating position, filling of the first packing trough takes place. If the separating means is in the second separating position, filling of the second packing trough takes place. In this embodiment, the control unit is configured to position the separating means, based on the control signal, optionally at the first separating position or at the second separating position. This avoids overfilling the first and/or the second packing trough.

The first packing trough and the second packing trough preferably have the same capacity volume. Thus, the control unit, without further changes, can also compare the filling level value calculated for the second packing trough with the same adaptable threshold value in order to produce the control signal. Alternatively, a first adaptable threshold value can be allocated to the first packing trough and a second adaptable threshold value to the second packing trough. This is appropriate when the capacity volumes of the two packing troughs differ from one another.

Although presently, it was always a first packing trough and a second packing trough which have been mentioned, the present invention is naturally not restricted to one or two packing troughs. Instead, a multiplicity of packing troughs can be provided in the goods dispensing area of the checkout terminal. In this context, it is preferred that each of the packing troughs has one and the same capacity volume and it is preferred that the separating means determines in dependence on the filling level value and/or the control signal automatically which of the packing troughs is filled.

For the achievement of the abovementioned technical object, embodiments of a goods recording device and a method. The goods recording device and the method share the advantages of the checkout terminal described above and have embodiments which correspond analogously to the embodiments, described above, of the checkout terminal, especially as they are defined in the dependent claims. To this extent reference is made to the above description.

For example, it is provided, for example, that the goods recording device comprises the control unit of the checkout terminal.

BRIEF DESCRIPTION OF THE DRAWINGS

The concept forming the basis of the invention is to be explained in greater detail in the text which follows by means of the exemplary embodiment shown in the FIGURES, in which.

DETAILED DESCRIPTION

Figure 1A:
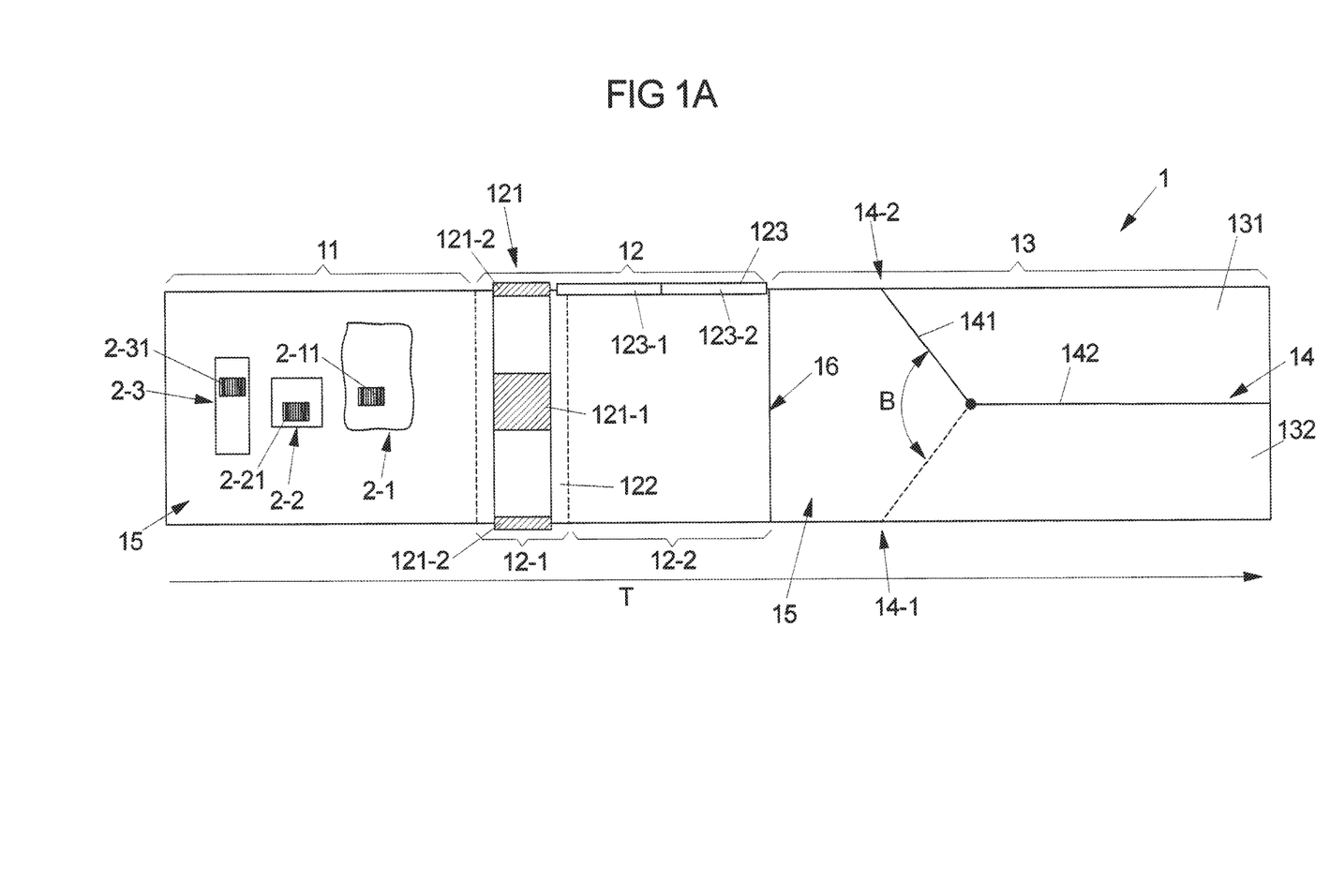
FIGS. 1A and 1B show diagrammatic views of an embodiment of a checkout terminal.
Figure 1B:
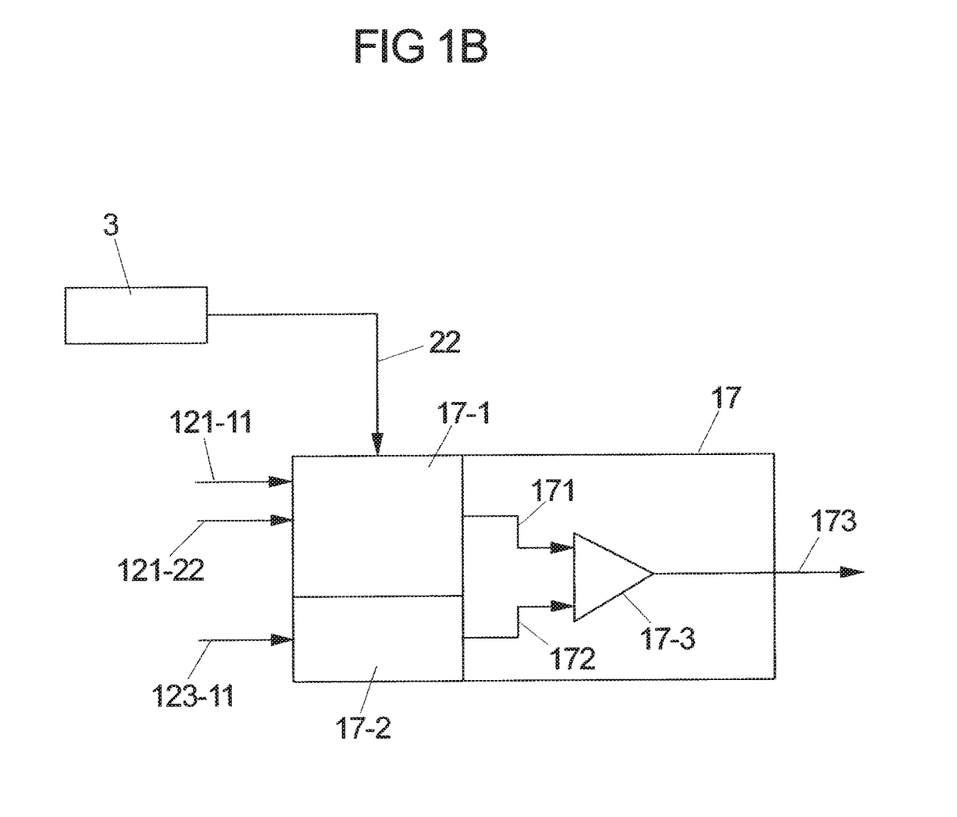

FIG. 1A and FIG. 1B show in a diagrammatic and an exemplary manner an embodiment of a checkout terminal 1. In the text which follows, reference is made to both FIG. 1A and FIG. 1B.

The checkout terminal 1 is suitable, for example, for use in a supermarket or any other store selling goods. By means of the checkout terminal 1, a customer (not shown in the FIGURES) is intended to record the data of goods assembled by him 2-1, 2-2 and 2-3, then handle, for example, a payment process and, finally, remove the goods again from the checkout terminal 1. The goods 2-1 to 2-3 are, for example, items of food, clothing items, medication, home improvement articles or the like.

The checkout terminal 1 has a goods receiving area 11, a goods recording area 12 following the goods receiving area in a direction of transport T and a goods dispensing area 13 following the goods recording area 12. A goods transport means 15, shown only diagrammatically in the FIGURES, of the checkout terminal 1 transports goods 2-1 to 2-3 from the goods receiving area 11 via the goods recording area 12 up to the goods dispensing area 13. The goods transport means 15 is configured, for example, in the form of a number of conveyor belts and extends via the goods receiving area 11 and the goods recording area 12 up to the goods dispensing area 13.

A customer, not shown in the FIGURES, hands, for example, his goods 2-1 to 2-3, assembled by him, into the goods receiving area 11, for example onto the part of the goods transport means 15 located there. The goods transport means 15 transports the goods 2-1 to 2-3 along the direction of transport T into the goods recording area 12.

In the goods recording area 12, a goods recording device 121 is provided which records the data of the goods 2-1 to 2-3. The goods recording area 12 is subdivided into a first area 12-1 and a second area 12-2. The first area 12-1 comprises a goods recording volume 122. Within this goods recording volume 122 the goods 2-1 to 2-3 must be located so that their data can be recorded by the goods recording device 121. Occasionally, errors will occur in this data recording by the goods recording device 121, or cases in which the data of particular goods cannot be recorded because they are covered, for example, by other goods. For this reason, the second area 12-2 of the goods recording area 12 is provided for rerecording by a service person (not shown in the FIGURES). Thus, the service person can later rerecord goods manually which have not or not correctly been recorded by the goods recording device 121. For these purposes, too, a user interface 123 shown only diagrammatically in the FIGURES is provided. The user interface 123 comprises an input means 123-1 which is configured for accepting user inputs of the service person, and an output means 123-2 which is configured for outputting information relevant for a checkout process for the service person.

The goods recording device 121 comprises a scanner 121 1 and a measuring unit 121-2. The scanner 121-1 scans a respective scannable identifier of the goods located within the goods recording volume 122 and provides a scanning result signal 121-11. Such a scannable identifier is shown diagrammatically on the goods 2-1 and provided with the reference number 2-11. The goods 2-2 have a scannable identifier 2-21 and the goods 2-3 have a scannable identifier 2-31. The scannable identifiers 2-11 to 2-31 can be, for example, in each case a barcode, a QR code, an RFID label, an NFC label, a UPC code), a digital watermark and/or the like.

The scanner 121-1 scans the identifier 2-11 and can thus identify the goods 2-1. The identification of the goods 2-1 by the scanner 121-1 allows the procurement of prestored goods-related data 22 which are allocated to the respective scanned goods 2-1. Naturally, the price of the goods 2-1 can be determined in this way, for example. However, the goods-related data 22 can also or alternatively comprise: dimensions of the goods 2-1 and/or volumes of the goods 2-1, a weight of the goods 2-1, a type or a category of the goods 2-1 (like, for example, "fragile", "do not squeeze", "to be cooled" etc.) and/or storage characteristics of the goods (such as, for example, "falls over easily", "can be stored arbitrarily", "must be stored in a particular manner" etc.). The same applies to the goods 2-2 and 2-3.

The goods-related data 22 are kept available, for example, by a database 3, wherein the database 3 can be implemented in the checkout terminal 1 or can be remote from it. The location of the database 3 is presently of less importance; it is essential, instead, that the goods-related data 22 are made accessible to the checkout terminal 1. The goods-related data 22 are procured on the basis of the scanning result signal 121-11 or are already contained in the scanning result signal 121-11.

The scanner 121-1 is configured, for example, as tunnel scanner and arranged like a bridge over the goods transport means 15, as is shown diagrammatically in FIG. 1A. However, other scanner types can also be considered as, for example, a flat scanner, a handheld scanner, to be operated manually, or the like. The spatial-physical embodiment of the scanner 121-1 is presently less significant, it is essential, instead, that the scanner 121-1 records the scannable identifier 2-11 of the goods 2-1 and can thus identify the goods 2-1.

The same applies analogously to the scannable identifier 2-21 of the goods 2-2 and the scannable identifier 2-31 of the goods 2-3.

In addition to the scanner 121-1, the measuring unit 121-2 is provided. The measuring unit 121-2 of the goods recording device 121 measures the goods located within the goods recording volume 122 and provides a measuring result signal 121-22. The goods are measured, for example, optically, for example by using a number of light sources such as light sources which emit visible light and/or infrared light, or acoustically, for example by means of ultrasound.

For example, the measuring unit 121-2 is configured to determine a floor area of the goods located in the goods recording volume 122 and provide it as part of the measuring result signal 121-22, and/or a distance of the goods located in the goods recording volume 122 from the measuring unit 121-2. The floor area corresponds, for example, to a surface, facing the measuring unit 121-2, of the goods located in the goods recording volume 122, that is to say the area of the goods "seen" by the measuring unit.

The operation of the checkout terminal 1 is controlled by a control unit 17 provided for this purpose. The control unit 17 is shown only diagrammatically in FIG. 1B. It can be configured to be of one piece or arranged distributed in the checkout terminal 1. The control unit 17 is operatively connected to components of the checkout terminal 1 to be controlled, for example to the goods transport means 15, to the goods recording device 121 and further components of the checkout terminal 1. The control unit 17 is supplied, especially, with the measuring result signal 121-22 and the scanning result signal 121-11. A computer 17-1 of the control unit 17 processes these two signals 121-11 and 121-22. In addition, the control unit 17 can procure the goods-related data 22 by means of the scanning result signal 121-11 from the database 3 if the goods-related data 22 are not already provided as part of the scanning result signal 121-11 by the scanner 121-1.

After the goods 2-1 to 2-3 have been recorded by the goods recording device 121 in the goods recording area 12, they are supplied by the goods transport means 15 at a transfer point 16 to the goods dispensing area 13.

The goods dispensing area 13 comprises especially a first packing trough 131 and a second packing trough 132. The two packing troughs 131 and 132 are separated from one another by a separating means 14. The separating means comprises a first part 141 which is movably arranged along a direction of movement B at least between a first separating position 14-1 and a second separating position 14-2, and a second part 142 which is installed to be stationary. The separating means 14 delimits the two packing troughs 131 and 132 spatially from one another. For example, the control unit 17 is configured to control the first part 141 of the separating means 14 and, for example, to move it back and forth between the two separating positions 14-1 and 14-2. Depending on the separating position 14-1 and 14-2 in which the first part 141 of the separating means 14 is located, the goods 2-1 to 2-3 are supplied either to the first packing trough 131 or to the second packing trough 132. In the example shown, the two packing troughs 131 and 132 have the same capacity volume.

It is intended to prevent overfilling from occurring in the packing troughs 131 and 132. This is because this could lead to goods falling from the goods dispensing area 13 onto the floor (not shown in the FIGURES) or being damaged by being squeezed. This could lead to a disturbance of the sequence of the checkout process and thus, on the one hand, to dissatisfaction of the customers and/or of the service person and overall to a lower goods throughput of the checkout terminal 1.

The computer 17-1 of the control unit 17, therefore, calculates, based on the scanning result signal 121-11 and based on the measuring result signal 121-22, a filling level value 171 which is indicative of a goods filling level volume of one of the two packing troughs 131 or 132.

For the following statements, it shall be assumed that the first part 141 of the separating means 14 is located in the first separating position 14-1 so that the goods 2-1 to 2-3 are conveyed into the first packing trough 131 by the goods transport means 15. In this case, the filling level value 171 is indicative of a current goods filling level volume of the first packing trough 131.

For example, the control unit 17 comprises a memory 17-2 which keeps available an adaptable threshold value 172. Both the filling level value 171 and the threshold value 172 are supplied to a comparator 17-3 of the control unit 17. The comparator 17-3 continuously performs comparisons between the current filling level value 171 and the threshold value 172. The threshold value 172 is, for example, indicative of a maximum goods filling level volume of the first packing trough 131. In dependence on the comparison, the comparator 17-3 provides a control signal 173. The control signal 173 indicates, for example, whether the first packing trough 131 should be filled further (the current filling level value 171 is less than the threshold value 172) or if the filling of the first packing trough 131 is to be stopped or to be slowed down (the current filling level value 171 is greater than or equal to the threshold value 172).

For example, the control signal 173 is supplied to the goods transport means 15 which interrupts or slows down the transportation of the goods 2-1 to 2-3 toward the first packing trough 131 if the control signal 173 indicates that the filling of the first packing trough 131 should be stopped or slowed down. The control signal 173 can also be supplied to the output means 123-2 of the user interface 123 so that the service person of the checkout terminal 1 can be shown whether a further filling of the first packing trough 131 is desired or not.

The control signal 173 can be subject to inaccuracies at the beginning of operation of the checkout terminal 1 and/or at the introduction of new types of goods. For example, the control signal 173 then indicates that the first packing trough 131 should not be filled further even though the first packing trough 131 would still have space for further goods or it may happen that the control signal 173 indicates that the first packing trough 131 should be filled further although the capacity volume of the first packing trough 131 is already exhausted.

To avoid these inaccuracies, it is provided, for example, that the control unit 17 is configured to operate the checkout terminal 1 in accordance with a normal mode or a learning mode. If the checkout terminal 1 is in the learning mode, the control signal 173 is supplied to the output means 123-2. On the basis of this, the output means 123-2 indicates to the service person whether the first packing trough 131 is to be filled further or not. The service person has the ability to confirm this indication by means of a user input 123-11 via the input means 123-1.

This user input 123-11 can occur, for example, by voice command, by operating a mouse, a keyboard or a touch screen.

In any case, this user input 123-11 is supplied to the control unit 17.

However, the service person also has the ability to reject the indication on the output means 123-2. This would be the case, for example, if the output means 123-2 indicates by means of the control signal 173 that the first packing trough 131 should be filled further although the capacity volume is already exhausted or if it is indicated that the first packing trough 131 should not be filled further although capacity volume is still not exhausted. The control unit 17 is informed also of such a rejection in the form of the user input 123-11.

If the service person informs the control unit 17 that the control signal 173 indicates inaccurate or wrong information, the control unit 17 performs an adaptation of the threshold value 172 in the learning mode. If the service person indicates to the control unit 17, for example, that the first packing trough 131 should be filled further although the control signal 173 had indicated that the first packing trough 131 should not be filled further, the threshold value 172 is increased. In the opposite case, the threshold value 172 is decreased.

The threshold value 172 is, for example, indicative of a maximum capacity volume of the first packing trough 131. If the two packing troughs 131 and 132 are of the same size, that is to say have the same capacity volume, the adaptable threshold value 172 is identical for both packing troughs. If the two packing troughs 131 and 132 have a different capacity volume, an adaptable threshold value is stored for each packing trough 131 and 132 in the memory 17-2. In the normal mode of the checkout terminal 1, the control unit 17 ignores the user inputs 123-11 and does not perform any adaptation of the adaptable threshold value 172.

In the text which follows, the calculation of the filling level value 171 by the computer 17-1 of the control unit 17 will be explained in slightly greater detail.

As mentioned, the calculation of the filling level value 171 is based both on the scanning result signal 121-11 and on the measuring signal 121-22. The measuring result signal 121-22 is indicative, for example, of a floor area of the goods located in the goods recording volume 122. This floor area corresponds, for example, to a surface of the goods which faces the measuring unit 121-2.

On the other hand, the computer 17-1 is supplied with the scanning result signal 121-11 which is indicative of an identification of the goods. The scanning result signal 121-11 can already include goods-related data such as dimensions of the data (for example height, length and/or width of the goods, weight of the goods, type of the goods, storage characteristics of the goods etc.). If this is not the case, the computer 17-1 procures, by means of the identification of the scanned goods, i.e. by means of the scanning result signal 121-11, the goods-related data 22 themselves from a database 3.

The computer 17-1 then performs, for example, a comparison between the goods-related data 22 and the measuring result signal 121-22. For example, the comparison is indicative of the state of alignment in which the goods transported by the transport means 15 are located. If the goods 2-2 are, for example, a cuboid drinks bag, this comparison will allow the computer 17-1 to conclude whether the drinks bag is arranged standing on the goods transport means 15 or lying. This information is significant for the calculation of the goods filling level volume of the first packing trough 131, that is to say for the calculation of the goods filling level value 171 since, for example, a lying drinks bag takes up more space in the first packing trough 131 than a standing one. On the other hand, the computer 17-1 can take into consideration in the calculation of the goods filling level value 171 that a standing cuboid drinks bag also has a tendency to tip over during the transportation along the direction of transport T. Such an insecurity factor can also be taken into consideration in the calculation of the filling level value 171.

Furthermore, the computer 17-1 can conclude on the basis of the comparison between the goods-related data 22 and the measuring result signal 121-22 whether, for example, further goods are covered underneath goods and are thus not accessible, for example, to the scanning process by the scanner 121-1. The computer 17-1 can then cause a signal to be output which indicates to the service person that the covered goods must be rerecorded manually.

If the goods-related data also contain, for example, information about the type of the goods scanned in each case, the computer 17-1 can determine, for example, that more volume has to be planned (allocated) for the relevant goods in the first packing trough 131 than only the volume which corresponds to the product of length×widt×height because, for example, the relevant goods must not be squeezed. This is the case, for example, with pressure-sensitive food items such as herbs or the like.

Due to the accurate calculation of the current goods filling level volume of the packing trough which is currently being filled, a reliable and interference-free operation of the checkout terminal 1 is possible. For example, the goods transport means 15 is configured to check the transportation of the goods 2-1 to 2-3 in dependence on the filling level value 171 and/or in dependence on the control signal 173, for example by setting a particular transport speed and/or by interrupting the transportion of the goods 2-21 to 2-3. The same applies analogously for the separating means 14. For example, the control unit 17 controls the movement of the first part 141 in dependence on the control signal 173. If the control signal 173 indicates, for example, that the first packing trough 131 should not be filled any further, the control unit 17 initiates the automatic movement of the first part 171 from the first separating position 14-1 to the second separating position 14-2 so that now only the second packing trough 132 is filled.

Calculating the filling level value 171 includes, for example, summing up the individual volumes of the goods 2-1 to 2-3. These individual volumes are determined, for example, on the basis of the goods-related data 22 and are then adapted in dependence on the measuring result signal 121-22.

In the text which follows, the learning mode of the checkout terminal 1 will be discussed in slightly greater detail still. As mentioned, the calculation of the filling level value 171 includes, for example, the summing up of the (possibly adapted) volumes of the individual goods 2-1 to 2-3. In this context, it may happen that the currently calculated filling level value 171 deviates from the current actual goods filling level volume of the first packing trough 131. Thus, the control signal 173 can falsely indicate that the first packing trough 131 no longer is to be filled even though the capacity volume of the first packing trough 131 is not yet fully exhausted or that the first packing trough 131 is to be filled further although the capacity volume of the first packing trough 131 is already exhausted. If the checkout terminal is in the learning mode, the control signal 173, for example, when it indicates that the first packing trough 131 should not be filled any further, does not have to immediately result in a standstill of the goods transport means 15 but, for example, only in a message to the service person via the output means 123-2 that the first packing trough 131 threatens to overflow. An acceptable compromise between the occurrence of premature or delayed warnings can be minimized, for example, by the fact that the said threshold value 172 is determined correctly. For example, the adaptable threshold value 172 is determined empirically by means of average values over a representatively adequately large number of measuring runs. For example, the individual volumes of the goods 2-1 to 2-3 are here summed up by the computer 17-1, e.g., by means of the goods-related data 22. These calculations can be combined or replaced by summing up the individual floor areas of which the computer 17-1 is informed by means of the measuring result signal 121-22. The threshold value 172 can also be adapted depending on the philosophy of the provider of the goods 2-1 to 2-3. If, for example, it is desired that the first packing trough 131 is filled only up to a small amount, the adaptable threshold value 172 is reduced. If the philosophy of the provider of the goods 2-1 to 2-3 is aimed more for as high as possible a goods throughput, the adaptable threshold value 172 is incremented.

If the output means 123-2 indicates to the service person, on the basis of the control signal 173, that the first packing trough 131 threatens to become overfilled, the service person can check the validity of this message with a look at the relevant packing trough 131. If the message does not apply, the message can be acknowledged as "not applicable" depending on situation and market philosophy, and this acknowledgement supplied to the control unit 17 in the form of the user input 123-11. The service person can also simply ignore or acknowledge the message without the control unit 17 being supplied with a relevant user input, so that the message is only no longer displayed by the output means 123-2. If, however, the message applies, this message can be acknowledged as "applicable" depending on situation and market philosophy in the learning mode and the corresponding user input 123-11 can be supplied to the control unit 17. It is then also possible that the service person, depending on the quantity of the possibly remaining goods which are not yet contained in the packing trough 131, rerecords these manually in the goods receiving area 11 and/or in the goods recording area 12. The service person could also report to the customer to go to the packing trough 131 and to pack up the goods, the data of which have already been recorded, so that further goods can be supplied automatically by the goods transport means 15 to the first packing trough 131. Other service personnel can also sort the goods already located in the packing trough 131 in a more space-saving manner so that new capacity volume is created for further goods in the packing trough 131. On the other hand, it is possible that the control unit 17, following the user input 123-11 acknowledging the message, causes the first part 141 of the separating means 14 to be moved from the first position 14-1 to the second separating position 14-2 so that subsequent goods are not supplied to the first packing trough 131 but to the adjacent second packing trough 132. In this case, the control unit 17 can automatically point out optically or acoustically to the customer that the goods of the customer are distributed over a number of packing troughs 131 and 132. It is also possible that the control unit 17, following the reception of a user input 123-11 acknowledging the message, causes the goods transport means 15 to interrupt the transportation of the goods along the direction of transport T.

LIST OF REFERENCE SYMBOLS/ABBREVIATIONS USED

1 Checkout terminal
11 Goods receiving area
12 Goods recording area
12-1 First area
12-2 Second area
121 Goods recording device
121-1 Scanner
121-11 Scanning result signal
121-2 Measuring unit
121-22 Measuring result signal
122 Goods recording volume
123 User interface
123-1 Input means
123-11 User input
123-2 Output means
13 Goods dispensing area
131 First packing trough
132 Second packing trough
14 Separating means
14-1 First separating position
14-2 Second separating position
141 First part
142 Second part
15 Goods transport means
16 Transfer point
17 Control unit
17-1 Computer
17-2 Memory
17-3 Comparator
171 Filling level value
172 Threshold value
173 Control signal
2-1, 2-2, 2-3 Goods 2-11 Scannable identifier
22 Goods-related data
3 Database
T Direction of transport
B Direction of movement

What is claimed is:

1. A method for operating a checkout terminal comprising the steps of:
    transporting at least one good with one or more conveyors along a direction of transport from a goods receiving area to at least one packing trough, the at least one packing trough defining a filling area;
    scanning an optical identifier applied to the at least one good with a scanner as the at least one good is transported in the direction of transport from the goods receiving area;
    providing, from the scanner to a microcontroller of a control unit, a scanning result signal corresponding to the optical identifier;
    procuring from a database, with the microcontroller of the control unit, goods-related data including physical dimensions of the at least one good based on the scanning result signal;
    measuring a floor area of the at least one good with an optical measuring unit as the at least one good is transported in the direction of transport;
    providing, with the optical measuring unit, a measuring result signal to the microcontroller of the control unit, the measuring result signal including at least the floor area; and
    calculating, with the microcontroller of the control unit, a filling level value in dependence on both the scanning result signal from said scanning of the optical identifier applied to the at least one good and the measuring result signal from said measuring of the floor area of the at least one good, said calculating completed before the at least one good reaches the at least one packing trough.

2. The method of claim 1 wherein said procuring is further defined as:
    procuring from the database, with the microcontroller of the control unit, the goods-related data including the physical dimensions and a weight of the at least one good based on the scanning result signal.

3. The method of claim 1 wherein said procuring is further defined as:
    procuring from the database, with the microcontroller of the control unit, the goods-related data including the physical dimensions and a category of the at least one good based on the scanning result signal, the category is one of fragile, "do not squeeze," and "to be cooled".

4. The method of claim 1 wherein said procuring is further defined as:
    procuring from the database, with the microcontroller of the control unit, the goods-related data including the physical dimensions and a storage characteristic of the at least one good based on the scanning result signal, the storage characteristic is one of "falls over easily," "can be stored arbitrarily," "must be stored in a particular manner".

5. The method of claim 1 wherein said scanning is further defined as:
    scanning the optical identifier applied to the at least one good with the scanner arranged as a bridge over the one or more conveyors as the at least one good is transported in the direction of transport from the goods receiving area.

6. The method of claim 1 wherein said measuring is further defined as:
    measuring the floor area of the at least one good with the optical measuring unit as the at least one good is transported in the direction of transport, wherein the floor area is a surface of the at least one good facing the optical measuring unit.

7. The method of claim 1 wherein said transporting is further defined as:
    transporting the at least one good with the one or more conveyors along the direction of transport from the goods receiving area to a plurality of packing troughs including a first packing trough and a second packing trough, each of the first packing trough and the second packing trough defining respective first and second filling areas.

8. The method of claim 7 further comprising:
    movably arranging a first part of a separating means along the direction of transport ahead of the first packing trough and the second packing trough; and
    separating the first packing trough and the second packing trough with a second part of the separating means.

9. The method of claim 8 further comprising:
    comparing, with a comparator of the control unit, the filling level value with a threshold value, the threshold value indicative of a maximum goods filling level volume of the first packing trough;
    providing, with the comparator of the control unit, a control signal indicative of whether one of the plurality of packing troughs should be filled further; and
    moving, with the microcontroller of the control unit, the first part of the separating means in dependence on the control signal.

10. The method of claim 9 further comprising:
    supplying the control signal to the one or more conveyors; and
    slowing down the transportation of the at least one good in dependence on the control signal.

11. The method of claim 8 further comprising:
    comparing, with a comparator of the control unit, the filling level value with a threshold value, the threshold value indicative of a maximum goods filling level volume of the first packing trough;
    providing, with the comparator of the control unit, a control signal indicative of whether one of the plurality of packing troughs should be filled further; and
    outputting, with the control unit, the control signal to a service person of the checkout terminal whereby the service person is shown whether further filling of the one of the plurality of packing troughs is desired or not.

12. The method of claim 11 further comprising:
    supplying, to the control unit, a user input responsive to said outputting, the user input being one of a voice command, operation of a mouse, operation of a keyboard and operation of a touch screen.

13. The method of claim 12 further comprising:
    changing, with the control unit, the threshold value in response to the user input supplied during said supplying.

14. The method of claim 13 wherein said changing is further defined as:
    increasing, with the control unit, the threshold value in response to the user input supplied during said supplying.

15. The method of claim 13 wherein said changing is further defined as:
   decreasing, with the control unit, the threshold value in response to the user input supplied during said supplying.

16. The method of claim 12 further comprising:
   ignoring, with the control unit, the user input supplied during said supplying and not the changing the threshold value.

17. The method of claim 1 wherein said measuring is further defined as:
   measuring the floor area of the at least one good with the optical measuring unit as the at least one good is transported in the direction of transport wherein the floor area corresponds to a surface of the at least one good that faces the optical measuring unit.

18. The method of claim 1 further comprising:
   comparing, with the control unit, the goods-related data and the measuring result signal to indicate a state of alignment of the at least one good.

19. The method of claim 18 wherein said comparing is further defined as:
   comparing, with the control unit, the goods-related data and the measuring result signal to conclude whether the at least one good is arranged standing on the one or more conveyors or lying on the one or more conveyors.

20. The method of claim 1 further comprising:
   allocating, by the control unit, more volume in the at least one packing trough for the at least one good than only a volume which corresponds to a length, width, and height of the at least one good based on the goods-related data.

* * * * *